Patented June 11, 1946

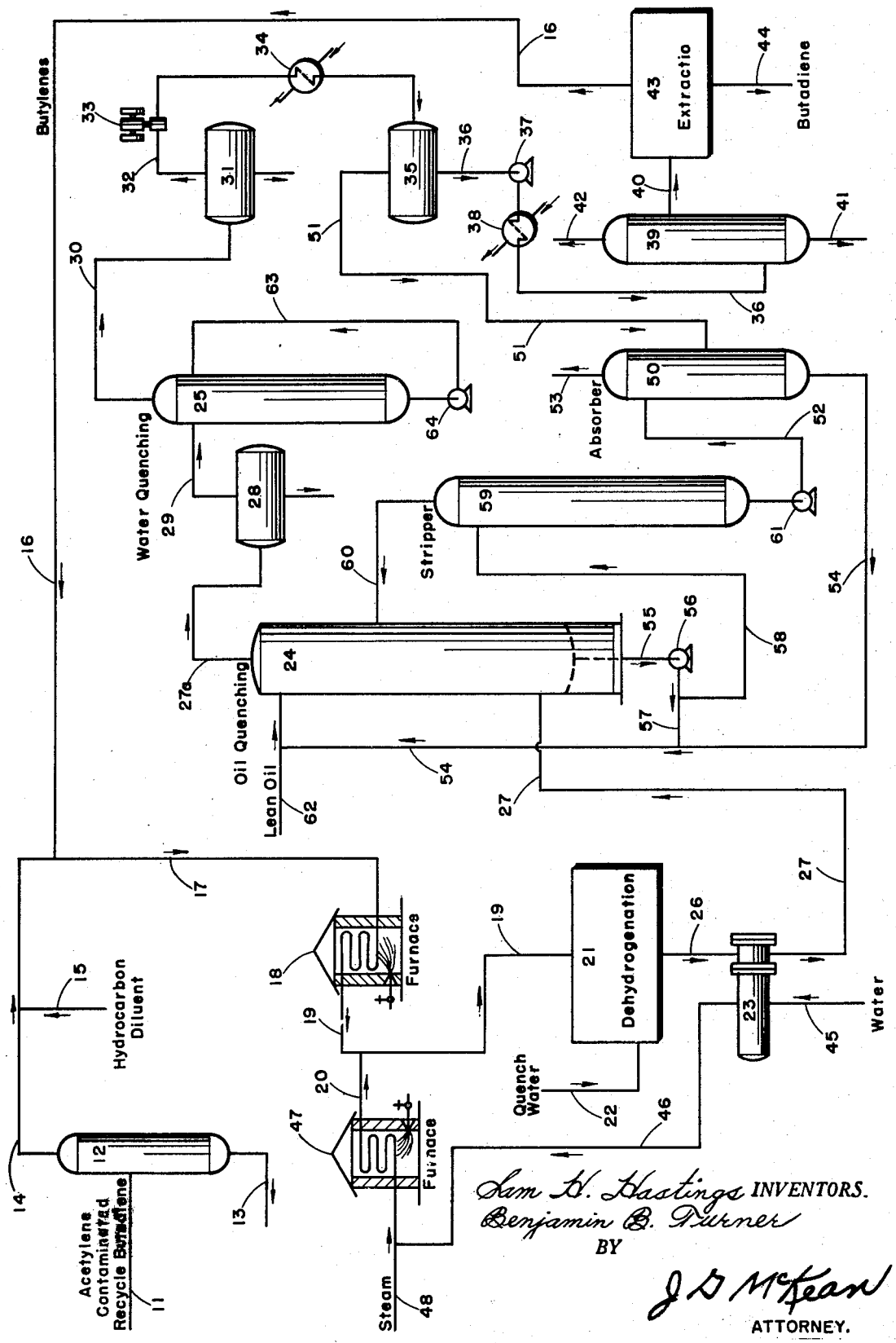

2,401,758

UNITED STATES PATENT OFFICE 2,401,758

ELIMINATION OF ACETYLENES FROM DIOLEFINS

Sam H. Hastings and Benjamin B. Turner, Baytown, Tex., assignors to Standard Oil Development Company, a corporation of Delaware Application June 27, 1944, Serial No. 542,388

5 Claims. (Cl. 260—681.5)

The present invention is directed to the removal of acetylenes from a hydrocarbon mixture. In its more specific aspects, the invention is directed to the removal of acetylenes from a hydrocarbon mixture including diolefin without destroying appreciable amounts of the diolefin.

At the present time, there is a substantial commercial demand for diolefins and particularly for butadiene. These diolefins are usually produced by dehydrogenation of mono-olefins or by the steam cracking of heavy naphthas. When producing butadiene by either of these methods, small quantities of acetylenes, such as methyl, ethyl and vinyl acetylenes, are produced along with the diolefins. The product, either from the dehydrogenation or steam cracking step, is diluted by substantial amounts of undesired hydrocarbons, and it is customary to subject the product to a concentration step, such as solvent extraction, in order to concentrate the butadiene. The solvent commercially used for the extraction step is an aqueous ammoniacal solution of cuprous ammonium acetate, and is selective to acetylenes as well as butadiene. As a result, there is obtained from the extraction step a butadiene fraction which is contaminated by substantially all of the acetylenes contained in the feed supplied to the extraction step.

A common commercial use for fractions comprising butadiene is in a copolymerization reaction for the production of synthetic rubbers. As a specific example, it is customary to copolymerize butadiene and styrene to form the copolymer Buna-S or GR-S. In such chemical reactions the butadiene charged is rapidly combined and removed from the reaction zone while any impurities in the feed stock tend to remain as impurities in the reaction zone. For example, although the concentration of acetylenes in the butadiene charged to the reaction zone may be below 0.1 weight per cent, their concentration within the reaction zone may increase rapidly with the result that the concentration of the acetylenes in the recycled butadiene from the reaction zone may be as great as 5 per cent. Inasmuch as the maximum allowable concentration of acetylenes in the finished product is usually fixed at 0.1 weight per cent, the desirability of having a low concentration of acetylenes present in the reaction zone will be evident. It is to be emphasized that in the recycle stream withdrawn from the copolymerization reactor, substantial amounts of desirable diolefins are present in addition to acetylenes and other undesirable impurities, such as dimer, peroxides, styrene, $C_3$ hydrocarbons, $C_5$ hydrocarbons, butylenes and aldehydes.

An object of the present invention is the treatment of a mixture of hydrocarbons comprising substantial quantities of diolefins and appreciable amounts of acetylenes to remove acetylenes from the mixture without destroying appreciable amounts of diolefins.

More specifically, it is an object of the present invention to devise a method for treating a hydrocarbon mixture of the character of that removed as a recycle stream from copolymerization reactions, including both acetylenes and butadienes, which removes acetylenes from the stream without appreciably decreasing the butadiene content thereof.

In accordance with the present invention, a hydrocarbon mixture having diolefins and acetylenes present therein is subjected to dehydrogenation conditions maintained to cause the substantial destruction of the acetylenes without destroying appreciable amounts of diolefin. Product from the dehydrogenation zone is rapidly quenched to terminate the reaction and then subjected to concentration steps including distillation and extraction to obtain a diolefin fraction having no more than a negligible amount of acetylenes as a contaminant.

The dehydrogenation of the mixture comprising diolefins and acetylenes is conducted in the presence of any well known dehydrogenation catalyst. A critical feature in conducting the dehydrogenation step to destroy acetylenes without harming appreciable amounts of the diolefins is the maintenance of a suitably low concentration of diolefin in the dehydrogenation reaction zone; this is preferably accomplished by maintenance of the proper concentration of feed to this zone.

It is preferred to conduct the dehydrogenation reaction at temperatures in the range of 1150° to 1300° F., with pressures ranging from 1 to 2 atmospheres absolute and with the mixture passed over the dehydrogenation catalyst at a space velocity ranging from 200 to 500 volumes of mixture per volume of catalyst per hour.

In order to prevent the loss of butadiene from the mixture passed through the dehydrogenation zone, it is necessary that the quantity of diolefin be no greater than 3 percent of the hydrocarbon present in the dehydrogenation zone. In accordance with the conventional practice when dehydrogenating hydrocarbons, substantial amounts of steam are admixed with the hydrocarbon and passed through the dehydrogenation zone. For example, it has been found desirable to employ from 3 to 15 volumes of steam per volume of hydrocarbon in the dehydrogenation zone.

An embodiment of the present invention will now be described in conjunction with the drawing in which the figure is in the form of a diagrammatic flow sheet.

Turning now specifically to the drawing, a hydrocarbon stream typical of that obtained from the recycled butadiene stream from a copolymerization process is passed by inlet 11 into distillation tower 12. In tower 12 the $C_5$ and heavier hydrocarbons are separated and removed by outlet 13, and the remainder are removed as overhead through outlet 14. It is to be understood that the feed entering through line 11 includes substantial amounts of butadienes and appreciable amounts of acetylenes which pass from tower 12 as overhead. The butadiene content in line 14 is diluted to no greater than 3 per cent by admixture with additional hydrocarbons. Diluent may be added to the stream in line 14 by inlet 15 and by a recycle stream from line 16, with the resulting mixture passing through line 17 and furnace 18 into line 19, where it is admixed with diluent steam entering through line 20.

The mixture from line 19 passes into dehydrogenation reactor 21 and is subjected to dehydrogenation conditions to cause the destruction of substantially all of the acetylenes in the admixture without appreciably lowering the quantity of diolefins therein.

Following the dehydrogenation step, the temperature of the reaction products and the steam from the reaction zone is reduced as rapidly as possible by the introduction of a water spray into the lower portion of the dehydrogenation reaction zone by means of line 22, a heat exchanger 23, an oil quenching zone 24 and a water quenching zone 25. The mixture of hydrocarbon reaction products and steam is withdrawn from dehydrogenation reaction zone 21 by line 26 and passed to the heat exchanger 23, which is in the form of a waste heat boiler, and is passed thence via line 27 to oil quenching zone 24. The vapors from the oil quenching zone pass through line 27a and into separator 28 to separate water from the hydrocarbons and the vapors are passed on through line 29 to water quenching tower 25. Vapors from water quenching tower 25 are withdrawn through line 30, pass into a second settling drum 31 to remove condensate from the vapors, and thence through line 32 containing compressor 33 and cooler 34 into separating vessel 35. The liquid accumulating in vessel 35 is the desired $C_4$ fraction and is withdrawn from the bottom of this vessel through line 36 containing pump 37 and heater 38 and into distillation tower 39, where the butadiene fraction may be removed as a side stream through line 40. A heavier fraction is withdrawn from the bottom of the tower through line 41 and a lighter fraction through line 42. The desirable fraction from side stream 40 may be sent to a butadiene extraction tower 43; a finished butadiene stream is withdrawn from the extraction tower through outlet 44 and a fraction comprising essentially butylenes is withdrawn from the extraction plant via line 16 for admixing with other fractions to form the feed as has been before described.

It is desirable to obtain at least a portion of the steam sent to the dehydrogenation zone from the waste heat boiler 23 and this may be done by passing water into the boiler through inlet 45 and steam is withdrawn from the boiler 23 through line 46 to a furnace 47 where it is heated to a suitable temperature and then admixed by means of line 20 with the hydrocarbon feed flowing in line 19. If sufficient steam for the process is not produced by boiler 23, additional steam may be added to the system by inlet 48.

It is preferred to operate oil quenching tower 24 in conjunction with an absorber unit 50. In the separating vessel 35 for separating the $C_4$ fraction as a liquid, the uncondensed fraction may contain appreciable amounts of $C_4$ hydrocarbons. It is desirable to remove these hydrocarbon vapors through line 51 to absorber vessel 50, where they flow countercurrent to a stream of oil injected through the top of the absorber by line 52. The unabsorbed vapors from vessel 50 may be removed from the system via outlet 53. The rich absorber oil from vessel 50 may be withdrawn through line 54 and returned to the top of quench tower 24 to serve as a quenching oil therein. The oil falling to the bottom of tower 24 is removed through line 55 containing pump 56 and the stream split, with a portion being added to the oil flowing in line 54 by means of connection 57 and the mixture used as the quenching oil and the remainder flowing through branch 58 to stripping tower 59. In the stripping tower, the lighter constituents are removed from the oil and returned to the quenching tower through line 60 and the lean oil is removed via line 52 containing pump line 61 and passed into absorber tower 50. If desired, a make-up lean oil may be added to the oil being circulated in line 54 by inlet 62. The water quenching tower 25 is conventional, and is provided with water circulating line 63 containing pump 64.

The following is given as a specific example illustrating the practice of the present invention. The hydrocarbon stream from a copolymerization reaction and containing approximately 50 per cent of butadiene and 3.5 of acetylenes was admixed with a recycled butylene stream and a fresh butylene stream to form an admixture having 2.6 per cent butadiene and 0.15 per cent acetylenes present therein. This admixture was heated to a temperature of 1225° F., admixed with steam at the same temperature in the ratio of one part of hydrocarbon to nine parts of steam and passed over a dehydrogenation catalyst consisting approximately of 80 per cent MgO, 14 per cent $Fe_2O_3$, 3 per cent $K_2O$ and 3 per cent CuO at the rate of 500 volumes of feed per volume of catalyst per hour with the dehydrogenation catalyst temperature maintained at approximately 1225° F. The product from the dehydrogenation reactor was quenched rapidly, and the quenched product sent to a distillation zone to separate a $C_4$ fraction which was sent as feed to an extraction zone. The product removed from the distillation zone to the extraction zone included 14.8 per cent butadiene and 0.052 per cent acetylenes and the product removed from the butadiene extraction zone comprised 98.5 per cent butadiene and 0.35 per cent acetylenes. The feed employed in this process and the results of the reaction are shown in greater detail in the following table:

Table

| | Bbls./day | Composition of C fraction, vol. percent | | | | |
|---|---|---|---|---|---|---|
| | | Isobutylene | Butylenes | n-Butane | Butadiene | Acetylenes |
| Recycle butadiene stream | 400 | 0.0 | 36.5 | 10.0 | 50.0 | 3.5 |
| Recycle butylene stream | 7,400 | 6.0 | 49.0 | 44.5 | 0.5 | 0.0 |
| Fresh butylene stream | 1,400 | 2.0 | 83.0 | 15.0 | 0.0 | 0.0 |
| Mixture to dehydrogenator | 9,200 | 5.1 | 53.8 | 38.4 | 2.6 | 0.15 |
| Mixture to extraction plant | 8,600 | 5.1 | 42.0 | 38.1 | 14.8 | .052 |
| Product from extraction plant | 1,200 | | | | 98.5 | 0.35 |

While the butadiene produced in the aforementioned example exceeded the specification for acetylenes content, it is to be emphasized that this example is presented solely to illustrate the practice of the present invention. By adjusting and controlling the extraction zone where the butadiene is concentrated and the amount of recycle butadiene returned to the hydrogenation reactor, a product of satisfactory quality is obtained. Heretofore when recycle butadiene from a GR-S copolymerization reactor was returned to the system in accordance with conventional methods of operation it was impossible to produce a butadiene of satisfactorily low content of acetylenes.

It will be further understood that the preceding example is given only by way of illustration and not by way of limitation. Instead of the dehydrogenation catalyst used in the example, any suitable catalyst may be employed which is known to the dehydrogenation art. Similarly, the temperature of the dehydrogenation reaction is not to be restricted to that given in the example but may be varied from approximately 1150° to 1300° F. if desired. Moreover, although butylene is disclosed as the diluent employed for reducing the amount of butadiene in the feed charged to the dehydrogenation zone, other hydrocarbons, such as mono-olefins of lower or higher molecular weight than the butylene, or paraffins or naphthenes or mixtures thereof, may be employed as a diluent.

As previously emphasized, the essential feature of the invention is the maintenance of a suitably low concentration of diolefins in the hydrocarbon feed sent to the dehydrogenation zone. The concentration of the diolefin in the feed to the dehydrogenation zone must be no greater than 3 per cent in order to avoid decomposition of the diolefin. In the example given above, the concentration of the butadiene in the feed is 2.6 per cent; it will be apparent that this concentration may be decreased or increased up to 3 per cent if desired in carrying out the present invention.

Having fully described and illustrated the practice of the present invention, what we desire to claim is:

1. In the method of removing acetylene from a hydrocarbon mixture comprising substantial amounts of diolefin and acetylene, the steps of adding to the mixture hydrocarbon diluent free from acetylenes to reduce the content of diolefin therein to no more than 3 per cent and subsequently subjecting the resulting mixture to dehydrogenation conditions in the presence of a dehydrogenation catalyst comprising a major portion of MgO and minor portions of $Fe_2O_3$, $K_2O$ and CuO and maintained at a temperature within the range of 1150° to 1300° F. to cause the destruction of acetylenes.

2. A method for treating a fraction comprising substantial amounts of butadiene contaminated with acetylenes including the steps of adding to the mixture a hydrocarbon diluent free from acetylenes to reduce the diolefin content to no more than 3 percent of the hydrocarbons in the mixture and subsequently subjecting the resulting mixture to dehydrogenation in the presence of a dehydrogenation catalyst comprising a major portion of MgO and minor portions of $Fe_2O_3$, $K_2O$ and CuO and maintained at a temperature within the range of 1150° to 1300° F. to destroy acetylenes.

3. In the treatment of a hydrocarbon mixture comprising substantial amounts of butadiene and acetylenes, the steps of diluting the mixture with a hydrocarbon diluent free from diolefin and acetylenes to reduce the diolefinic content of the mixture to no more than 3 per cent, diluting the hydrocarbons with steam and passing the resulting mixture over a dehydrogenation catalyst comprising a major portion of MgO and minor portions of $Fe_2O_3$ and CuO maintained at a temperature in the range of from 1150° to 1300° F. to cause the destruction of acetylenes.

4. A method for treating an admixture comprising approximately 50 per cent of butadiene and substantially more than 3 per cent of acetylenes comprising the steps of diluting the mixture with a hydrocarbon free from diolefin and acetylenes to reduce the diolefin content of the resulting mixture to no more than 3 per cent, adding steam to the resulting hydrocarbon mixture and passing the hydrocarbon and steam through a zone where it is allowed to come in contact with a dehydrogenation catalyst comprising a major portion of MgO and minor portions of $Fe_2O_3$, $K_2O$ and CuO at a temperature in the range of 1150° to 1300° F. to cause the destruction of acetylene and subsequently removing the product from the dehydrogenation zone.

5. A method in accordance with claim 4 in which the mixture of butadiene and acetylenes is diluted with butylene.

SAM H. HASTINGS.
BENJAMIN B. TURNER.